United States Patent [19]

Musschoot

[11] 4,131,193

[45] Dec. 26, 1978

[54] VIBRATORY APPARATUS

[75] Inventor: Albert Musschoot, Barrington, Ill.

[73] Assignee: General Kinematics Corporation, Barrington, Ill.

[21] Appl. No.: 851,508

[22] Filed: Nov. 14, 1977

Related U.S. Application Data

[63] Continuation-in-part of Ser. No. 744,336, Nov. 23, 1976, abandoned.

[51] Int. Cl.² ............................................. B65G 47/19
[52] U.S. Cl. .................................. 198/533; 198/534; 198/547
[58] Field of Search ............... 198/523, 525, 530, 532, 198/533, 534, 540, 541, 547, 550, 557, 562, 616, 752, 544; 214/10, 15 D, 17 R; 222/161, 198, 199, 200

[56] References Cited

U.S. PATENT DOCUMENTS

| 2,539,070 | 1/1951 | Gebo | 198/544 X |
| 3,358,815 | 12/1967 | Musschoot et al. | 198/761 |
| 3,399,466 | 9/1968 | Hartley | 198/616 X |
| 3,707,222 | 12/1972 | Hartley | 198/534 |

FOREIGN PATENT DOCUMENTS

| 709237 | 5/1965 | Canada | 198/533 |
| 537737 | 3/1931 | Fed. Rep. of Germany | 198/534 |
| 567267 | 12/1932 | Fed. Rep. of Germany | 198/525 |
| 12073 | 3/1956 | Fed. Rep. of Germany | 198/533 |
| 2416963 | 10/1975 | Fed. Rep. of Germany | 198/525 |
| 1576207 | 7/1969 | France | 198/540 |
| 591030 | 4/1959 | Italy | 198/540 |

Primary Examiner—Evon C. Blunk
Assistant Examiner—James L. Rowland
Attorney, Agent, or Firm—Wegner, Stellman, McCord, Wiles & Wood

[57] ABSTRACT

A vibratory apparatus for de-piling or unpiling a mass of particulate material. The apparatus is to be positioned in a recess or opening in a base (presumably the ground) and particulate material piled thereover. Upon being vibrated, the apparatus delivers the material from a pile at a regulated rate into a conveyor system for transport to a place of use.

4 Claims, 5 Drawing Figures

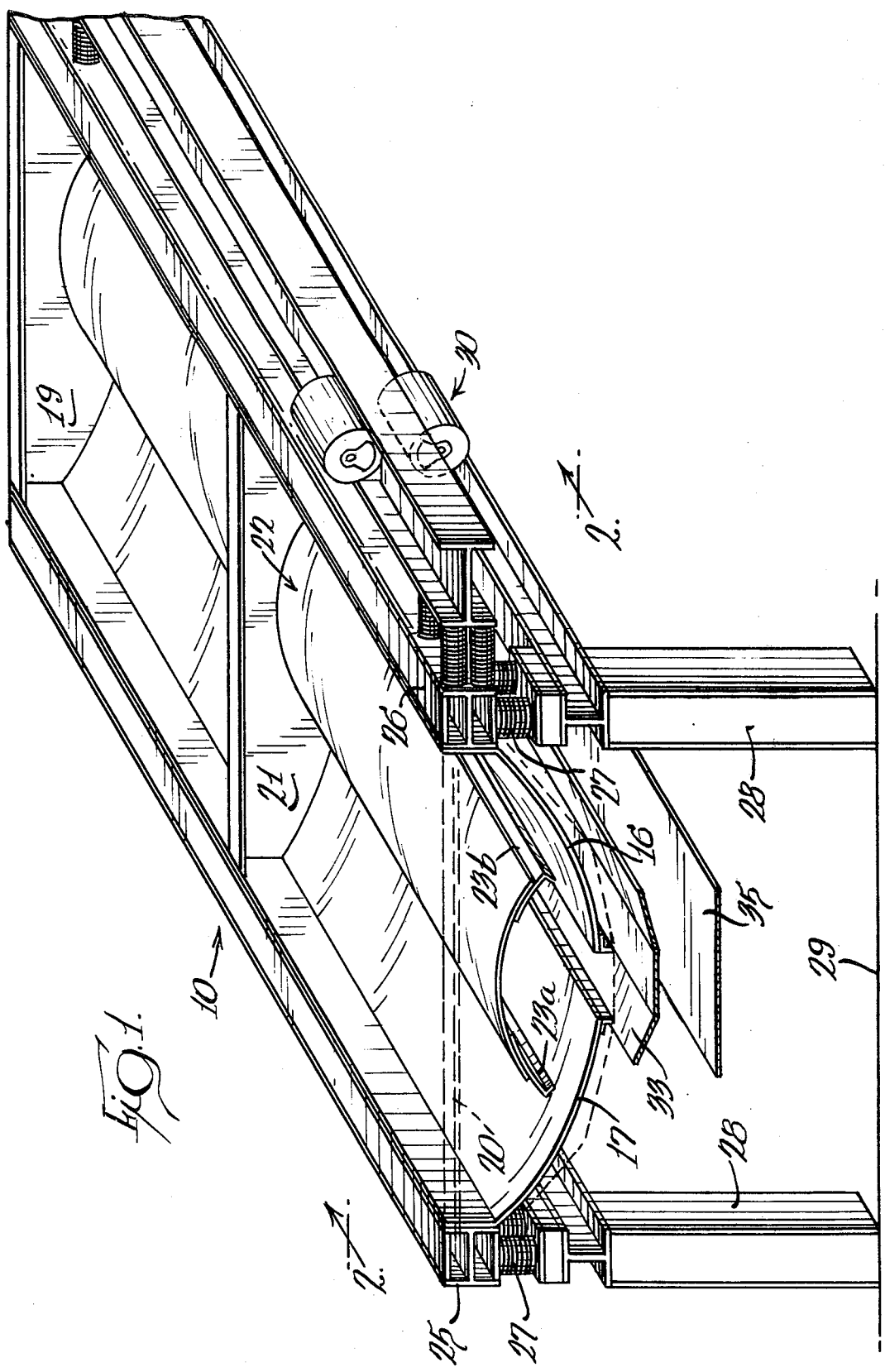

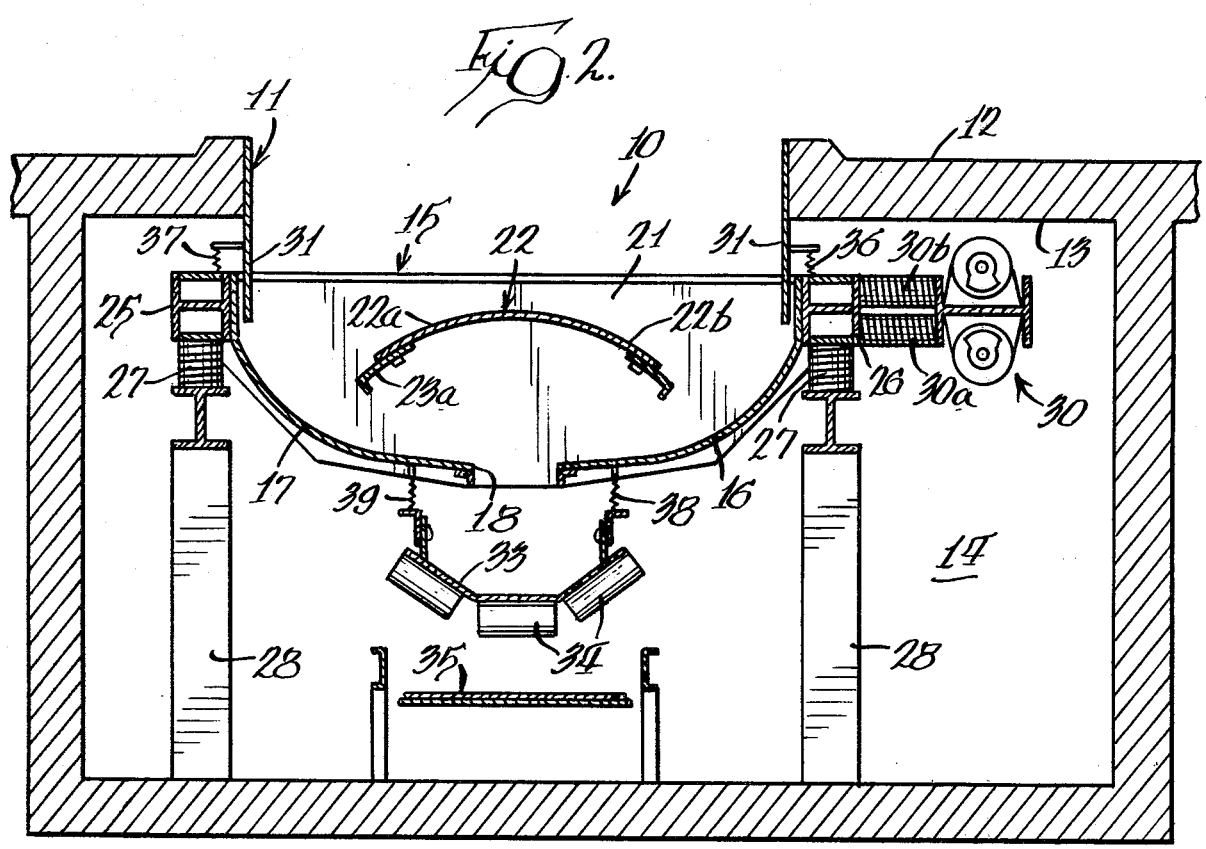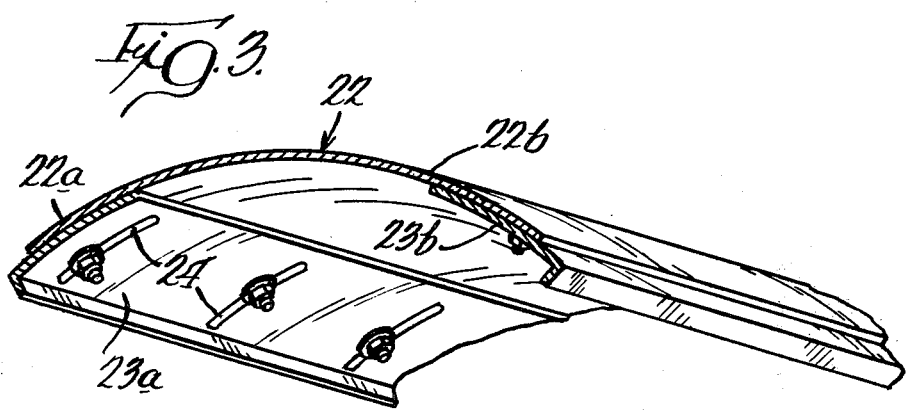

VIBRATORY APPARATUS

CROSS-REFERENCE

This application is a continuation-in-part of my co-pending application Ser. No. 744,336, filed Nov. 23, 1976, entitled "Vibratory Apparatus", now abandoned.

BACKGROUND OF THE INVENTION

De-pilers, or unpiling apparatus, have been used for quite some time. The normal application is in conjunction with a power station or other coal burning facility wherein large piles of coal are dumped over openings in the ground which lead into tunnels communicating with the furnace or other place of ultimate use. In such installations, a cylindrical hopper is located in the opening beneath the pile and the hopper can be vibrated in order to deliver material from the pile into a feeder. The feeder feeds the material delivered thereto at a regulated rate, the outlet of the feeder being connected to a conveyor such as a belt or the like which carries the coal at a predetermined rate to a furnace or other place of use. While feeders in the system just described normally operate constantly, the hoppers are operated at spaced intervals with periods of rest therebetween. This is normally because the delivery rate of the hoppers far exceeds the requirement of the feeders, and if the hoppers were vibrated with material therein which was not being discharged, the material would tend to pack and eventually bridge, causing cessation of flow.

SUMMARY OF THE INVENTION

According to the present invention, the hopper per se of the prior art is eliminated completely and an especially designed vibratory apparatus is provided which is located beneath an opening in the ground or base over which the material is piled. Preferably, the vibratory apparatus is arranged so that its rate of feed or delivery of the material can be varied. The arrangement is such that when the feeder is stopped, delivery of material also ceases; when the feeder is again started, delivery will resume. Also, if desired, the feeder may be operated continuously over relatively long periods. The result is that any tendency of the material to bridge or clot is avoided, the rate of delivery from the pile to the conveyor can be regulated, and a more efficient delivery of particulate material to the ultimate place of use can be achieved.

BRIEF DESCRIPTION OF THE DRAWINGS

FIG. 1 is an elevational view of the vibratory apparatus portion of the present invention;

FIG. 2 is a vertical section along line 2—2 of FIG. 1;

FIG. 3 is an enlarged view of an edge portion of the deflector forming a part of the apparatus in FIG. 2;

DESCRIPTION OF THE PREFERRED EMBODIMENT

Figure 4:
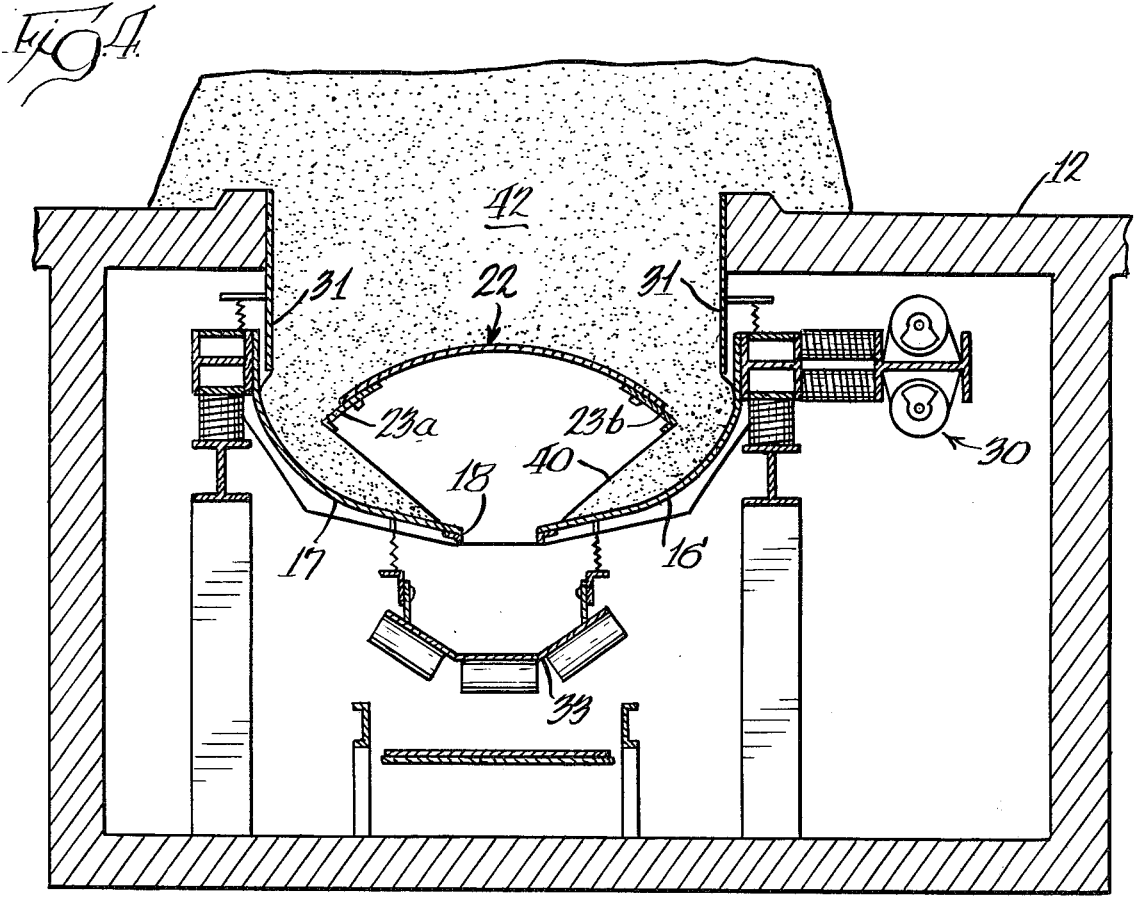
FIG. 4 is a vertical section like FIG. 2 showing the apparatus at rest but with material piled thereover.

Referring now to the embodiment of the invention shown in FIGS. 1 and 2, there is provided a vibratory apparatus 10 to be mounted just below a large opening or aperture 11 in a base 12. Actually, the base is formed by a concrete top 13 forming a portion of a tunnel or passage 14 beneath the opening. Under normal circumstances, the top of the base 12 will be at ground level and the aperture 11 is located immediately below a dumping place for the particulate material to be handled. In the normal installation, the material is coal, reduced to relatively small size, and an elevated railroad track is located over the aperture 11 so that the railroad cars carrying coal can be emptied with their contents falling downwardly and forming a pile on the base overlying the aperture 11. Located within the aperture 11 is the vibratory apparatus which includes a rectangular (preferably square) trough 15 having side walls 16 and 17 sloping downwardly to a center opening 18 which extends the entire length of the trough. The trough has end walls 19 and 20 and a center wall 21 which are vertically arranged as shown.

Overlying the opening 18 in the trough is a deflector generally designated 22 which has a first portion 22a arching downwardly from the center of the deflector toward the side wall 17 of the trough, and a second portion 22b arching downwardly from the center toward the side wall 16. The highest portion of the deflector 22 is spaced above the center of the opening 18.

The width of the deflector 22 may be varied for reasons hereinafter set forth. For this purpose, there is provided a pair of extension members 23a and 23b which are adjustably secured to the side edges of the portions 22a and 22b. To this end each extension member 23 is provided with a plurality of slots 24 into which bolts 24a fixed in side portion 22a, and bolts 24b fixed in side portion 22b, are received. The extension members are of the same length as deflector 22 and when fixed in place at the desired location, form a part of the deflector.

The trough 15 is secured to beams 25 and 26 extending along the sides thereof with the beams being supported on isolation springs 27 carried by posts 28 supported on the floor 29 of the tunnel 14.

A vibration generator 30 is secured by means of springs 30a and 30b to the beam 26 in order to impart vibrations to the trough 15. Preferably, the vibration generating apparatus 30 is similar to that shown in my U.S. Pat. No. 3,358,815, so that the amplitude of the vibrations generated thereby may be varied in order to vary the rate of discharge of the particulate material.

Material discharged from the trough 15 through the opening 18 falls upon a conveyor belt 33 moving on idlers 34 through the tunnel 14. The return of the belt is indicated at 35.

Dust seals 36 and 37 extend between a pair of vertical plates 31 forming the edges of the aperture 11, and the top of the beams 25 and 26. A second pair of dust seals 38 and 39 extend between the bottom of the trough 15 and the edges of the conveyor.

When the material is piled on the trough 15, it utlimately forms a large pile over the base 12 completely covering the opening 11. The material tends to pile up and stop between the outer edges of the extension members and the tops of the adjacent side walls 16 and 17 of the trough. In this condition, with the trough at rest, no material is delivered through the opening 18 onto the conveyor 33.

The angle of repose, sometimes called the slump angle, of a particulate material depends upon the nature of the particular material involved. Some materials may be piled higher (large angle of repose) than other material. When the piling continues after the pile of material has reached its angle of repose, the material will slump, increasing the diameter of the base of the pile while maintaining the angle of repose constant. Vibrating a pile of material dramatically reduces the angle of repose.

Figure 5:
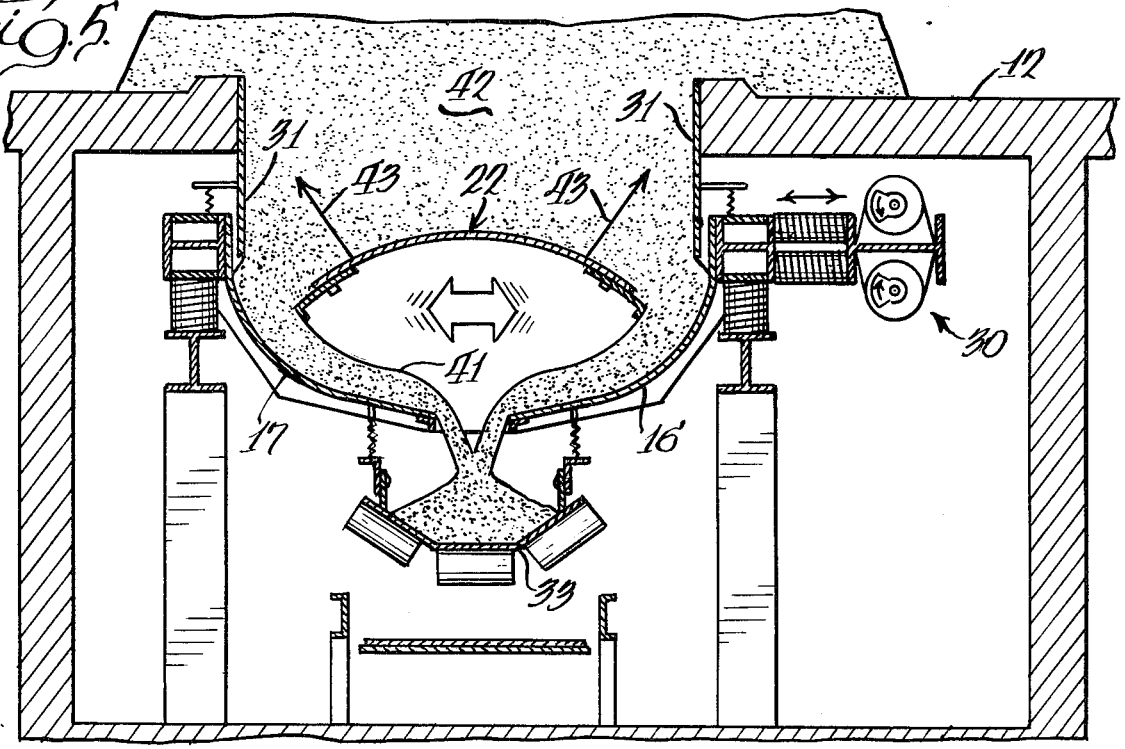
FIG. 5 is a view like FIG. 4 with the apparatus in operation.

In the present apparatus, the width of the deflector 22 is made adjustable by the provision of extension members 23a and 23b. It is the object to position the extension members where the angle of a line drawn from the outer edge of each extension member to the inner edge of the opening 18 relative to the horizontal is less than the angle of repose of the particular material handled. When this condition prevails, and the apparatus is at rest as shown in FIG. 4, the upper surface of the material below the deflector 22 lies along a line 40 which represents the angle of repose of the material. As can be seen, the lower edge of the material is short of the opening 18 and hence no flow occurs. When the vibrating apparatus is started, as shown in FIG. 5, the angle of repose of the material greatly lessens and the upper surface of the material lies along line 41 which, because it extends beyond the edges of opening 18, permits flow of material therethrough. The provision of the extension members 23a and 23b permits the deflector width to be adjusted to suit the slump angle characteristics of the particular material being handled.

A further feature of the apparatus is that, because the vibration is horizontal and normal to the longitudinal axis of the trough 15, each sloping side wall 16 and 17 acts as a vibratory feeder, feeding the material carried thereon toward the adjacent edge of the opening 18.

Also, when the vibrator is in operation, vibratory forces are transmitted into the pile 42 of particulate material overlying the opening 11, the primary vibrating forces being along the lines of the arrows 43 which are generally parallel to the internal sheer angles of the material, such sheer angles being themselves generally parallel to the angle of repose of the material at rest. Thus, de-piling freely occurs as the vibrator is actuated, and flow ceases when the vibrator is stopped.

I claim:
1. A vibratory apparatus for delivering particulate material and adapted for use in combination with a base having an aperture therein communicating with a passage beneath the base, said vibratory apparatus comprising a trough having an opening in the bottom thereof with the opening extending from one end of the trough to the other end thereof, said trough having side walls sloping downwardly and inwardly from the side of the trough to said opening, a deflector secured to the trough and extending upwardly therefrom, said deflector having its lower edges spaced from the side walls of the trough and having its center portion located above the opening in the trough, the angle to the horizontal of a line extending from the lower edges of the deflector to the adjacent edge of the opening being less than the static angle of repose of the material, means for mounting said vibratory apparatus in said aperture in the base to support material piled thereover, said mounting means including springs supporting the trough for vibratory movement, a vibration generator secured to said apparatus for vibrating the same in a direction transverse to the direction of extent of the opening, and a conveyor below the opening in the trough to receive material discharged therethrough.

2. A vibratory apparatus for delivering particulate material and adapted for use in combination with a base having an aperture therein communicating with a passage beneath the base, said vibratory apparatus comprising an elongated, rectangular trough having an opening in the bottom thereof with the opening extending substantially from one end of the trough to the other end thereof, an end wall at each of said ends of the trough, said trough having side walls sloping downwardly from the sides of the trough to said opening, a deflector secured to the end walls and extending upwardly from the trough, said deflector extending over the entire length of the opening and having its lower edges spaced from the side walls of the trough and having its center portion located above the opening in the trough, the angle to the horizontal of a line extending from the lower edges of the deflector to the adjacent edge of the opening being less than the static angle of respose of the material, means for mounting said vibratory apparatus in said aperture in the base to support material piled thereover, said mounting means including springs supporting the trough for vibratory movement, a vibration generator secured to said apparatus for vibrating the same in a direction transverse to the major axis of the trough, and a conveyor below the opening in the trough to receive material discharged therethrough.

3. A vibratory apparatus for delivering pariculate material and adapted for use in combination with a base having an aperture therein communicating with a passage beneath the base, said vibratory apparatus comprising an elongated rectangular trough having an opening in the bottom thereof with the opening extending from one end of the trough to the other end thereof, said trough having side walls sloping downwardly from the side of the trough to said opening, a deflector secured to the trough, said deflector being in the form of a longitudinal cylindrical section convex upwardly and extending from end to end of the trough, said deflector having its lower edges spaced from the side walls of the trough and having its center portion located above the opening in the trough, a pair of extension members each adjustably secured to a different one of the lower edges of the deflector and extending the length thereof, said extension members being adjustable to vary the effective width of the deflector to create a condition wherein the angle to the horizontal of a line extending from the outer edge of the extension members to the adjacent edge of the opening is less than the static angle of repose of the material, means for mounting said vibratory apparatus in said aperture in the base to support material piled thereover, said mounting means including springs supporting the trough for vibratory movement, a vibration generator secured to said apparatus for vibrating the same in a horizontal plane transverse to the extent of the opening, and a conveyor below the opening in the trough to receive material discharged therethrough.

4. In combination with a below-ground space defined by concrete walls said space having an aperture therein opening to ground surface over which ground a pile of coal or other particulate material is to be formed with the pile overlying the aperture, a de-piling apparatus located in said space below the aperture, said de-piling apparatus comprising a trough having an opening in the bottom thereof with the opening extending from one end of the trough to the other end thereof, said trough having side walls sloping downwardly and inwardly from the side of the trough to said opening, a deflector secured to the trough and extending upwardly therefrom, said deflector extending from one end of the trough to the other end and being positioned beneath said aperture to support the overlying material and said deflector having its lower edges spaced from the side walls of the trough and its center portion located above the opening in the trough, a pair of extension members each adjustably secured to a different one of the lower edges of the deflector and extending the length thereof, said extension members being adjustable to vary the effective width of the deflector to create a condition wherein the angle to the horizontal of a line extending from the outer edge of the extension members to the adjacent edge of the opening is less than the static angle of repose of the material, means for mounting said depiling apparatus in said space with the deflector positioned beneath said aperture, said mounting means including springs supporting the trough for vibratory movement, a vibration generator secured to said apparatus for vibrating the same horizontally in a direction transverse to the direction of extent of the opening, and a conveyor extending along and below the opening in the trough to receive material discharged therethrough.

* * * * *